(12) United States Patent
Sugimoto

(10) Patent No.: US 8,599,406 B2
(45) Date of Patent: Dec. 3, 2013

(54) IMAGE FORMING APPARATUS, PRINTING METHOD AND PRINTING PROGRAM FOR RECEIVING AN IMAGE FROM A SERVER VIA A NETWORK AND PRINTING THE IMAGE CORRESPONDING TO AREA DISPLAYED ON DISPLAY UNIT TO CORRESPOND TO A USER'S DESIGNATED SHEET SIZE

(75) Inventor: Hiroaki Sugimoto, Nagoya (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 780 days.

(21) Appl. No.: 12/401,874

(22) Filed: Mar. 11, 2009

(65) Prior Publication Data

US 2009/0310167 A1  Dec. 17, 2009

(30) Foreign Application Priority Data

Jun. 13, 2008  (JP) ................. 2008-155260

(51) Int. Cl.
| | |
|---|---|
| G06K 15/00 | (2006.01) |
| G06F 3/12 | (2006.01) |
| G06F 15/16 | (2006.01) |
| H04N 1/40 | (2006.01) |
| H04N 1/46 | (2006.01) |

(52) U.S. Cl.
USPC ....... 358/1.15; 358/1.12; 358/1.16; 358/3.23; 358/538; 709/203; 709/218; 709/219

(58) Field of Classification Search
USPC ......... 358/1.15, 527, 1.9, 1.16, 1.2, 1.6, 1.12, 358/1.18, 501, 504, 538, 444, 448, 3.23; 707/2, 100, 600, 705; 345/441, 629, 345/641, 7, 9, 10, 30, 40; 709/203, 217, 709/218, 219; 355/404, 18, 40, 55, 59, 78, 355/79, 132
See application file for complete search history.

(56) References Cited

U.S. PATENT DOCUMENTS

| | | | |
|---|---|---|---|
| 2002/0091758 A1* | 7/2002 | Singh et al. .................. | 709/203 |
| 2003/0189739 A1* | 10/2003 | Yamaguchi et al. .......... | 358/527 |

(Continued)

FOREIGN PATENT DOCUMENTS

| | | |
|---|---|---|
| JP | 11-355496 | 12/1999 |
| JP | 2002-209164 | 7/2002 |
| JP | 2008-28680 | 2/2008 |

OTHER PUBLICATIONS

Satoshi, Method and System for Image Distribution, Jul. 26, 2002, Machine translation Japanese Patent Application Publication, JP2002209164, all pages.*

(Continued)

*Primary Examiner* — Ngon Nguyen
(74) *Attorney, Agent, or Firm* — Morrison & Foerster LLP

(57) ABSTRACT

An image formation apparatus includes an acquisition unit for acquiring image data from a server, a display unit for displaying first image data of a first image size based on the image data acquired by the acquisition unit, a printer for printing the image data on a recording medium, a setter for setting a size of the image data printed on the recording medium, and a specification unit for specifying second image data of a second image size corresponding to the first image data so that the printer prints the second image data of the size of the image data set by the setter. The acquisition unit acquires the second image data of the second image size specified by the specification unit. The printer prints the second image data of the size set by the setter.

21 Claims, 10 Drawing Sheets

(56) References Cited

U.S. PATENT DOCUMENTS

2006/0010100 A1* 1/2006 McAvoy et al. ............. 707/2
2008/0018744 A1   1/2008 Sasaki
2008/0291205 A1* 11/2008 Rasmussen et al. ........ 345/441

OTHER PUBLICATIONS

Japanese Office Action mailed May 25, 2010, directed to counterpart Japanese Application No. 2008-155260; 4 pages.

* cited by examiner

FIG.6

IF SIZE OF DISPLAY REGION (PANEL REGION) IS 148.4 mm x 105 mm     110-2

| PRINT SHEET SIZE | RATIO TO DISPLAY REGION | SCALE REQUIRED TO SERVER | COORDINATES REQUIRED TO SERVER |
|---|---|---|---|
| B5 (182mm x 257mm) | 1.7 | MULTIPLY DISPLAYED SCALE BY 1.7 | X: PLUS/MINUS 89.25 mm FROM CENTER OF DISPLAY REGION<br>Y: PLUS/MINUS 126 mm FROM CENTER OF DISPLAY REGION |
| A4 (210mm x 297mm) | 2 | MULTIPLY DISPLAYED SCALE BY 2 | X: PLUS/MINUS 105 mm FROM CENTER OF DISPLAY REGION<br>Y: PLUS/MINUS 148.5 mm FROM CENTER OF DISPLAY REGION |
| B4 (257mm x 364mm) | 2.4 | MULTIPLY DISPLAYED SCALE BY 2.4 | X: PLUS/MINUS 126 mm FROM CENTER OF DISPLAY REGION<br>Y: PLUS/MINUS 178.2 mm FROM CENTER OF DISPLAY REGION |
| A3 (297mm x 420mm) | 4 | MULTIPLY DISPLAYED SCALE BY 4 | X: PLUS/MINUS 148.5 mm FROM CENTER OF DISPLAY REGION<br>Y: PLUS/MINUS 210 mm FROM CENTER OF DISPLAY REGION |

FIG.7

IF SIZE OF DISPLAY REGION (PANEL REGION) IS 148.4 mm x 105 mm

| PRINT SHEET SIZE | RATIO TO DISPLAY REGION | COORDINATES REQUIRED TO SERVER |
|---|---|---|
| B5 (182mm x 257mm) | 1.7 | X: PLUS/MINUS 89.25 mm FROM CENTER OF DISPLAY REGION<br>Y: PLUS/MINUS 126 mm FROM CENTER OF DISPLAY REGION |
| A4 (210mm x 297mm) | 2 | X: PLUS/MINUS 105 mm FROM CENTER OF DISPLAY REGION<br>Y: PLUS/MINUS 148.5 mm FROM CENTER OF DISPLAY REGION |
| B4 (257mm x 364mm) | 2.4 | X: PLUS/MINUS 126 mm FROM CENTER OF DISPLAY REGION<br>Y: PLUS/MINUS 178.2 mm FROM CENTER OF DISPLAY REGION |
| A3 (297mm x 420mm) | 4 | X: PLUS/MINUS 148.5 mm FROM CENTER OF DISPLAY REGION<br>Y: PLUS/MINUS 210 mm FROM CENTER OF DISPLAY REGION |

110-3

IMAGE FORMING APPARATUS, PRINTING METHOD AND PRINTING PROGRAM FOR RECEIVING AN IMAGE FROM A SERVER VIA A NETWORK AND PRINTING THE IMAGE CORRESPONDING TO AREA DISPLAYED ON DISPLAY UNIT TO CORRESPOND TO A USER'S DESIGNATED SHEET SIZE

This application is based on Japanese Patent Application No. 2008-155260 filed with the Japan Patent Office on Jun. 13, 2008, the entire content of which is hereby incorporated by reference.

BACKGROUND OF THE INVENTION

1. Field of the Invention

The present invention relates to an image formation apparatus connectable to a network, a printing method for the image formation apparatus and a printing program for the image formation apparatus. More specifically, the present invention relates to an image formation apparatus for receiving an image from a server via a network and printing the image, a printing method for the image formation apparatus and a printing program for the image formation apparatus.

2. Description of the Related Art

There is known a service providing map data from a web server through the Internet. A client device such as a personal computer that can use a web browser can acquire the map data from the web server by using such a service. Furthermore, a user of the client device can view a map on a monitor of the client device. The user of the client device can also print the map using an image formation apparatus connected to the client device.

There is also known an image formation apparatus including a function of accessing an external server via a network. Some image formation apparatuses of this type can use a web browser. In the image formation apparatus that can use the web browser, a display unit displays an image, a text and the like downloaded from the network. A printer prints the downloaded image and text. Therefore, there is no need for a user to download desired information using a personal computer and to cause the image formation apparatus to print the desired image. Namely, it is possible to save time and labor for user's inputting a print command to the personal computer and user's fetching a printed document from the image formation apparatus.

Furthermore, there is disclosed the following image processing apparatus in, for example, Japanese Laid-Open Patent Publication No. 11-355496. The image processing apparatus is configured so that an output schedule is set by a core unit based on user's intended output schedule information from a client terminal, designated information is acquired from information resources of a WWW server according to the set schedule, a data processing is performed to output the acquired information at a set timing, and so that a printer is controlled to perform an image output processing.

However, the conventional image formation apparatus has the following problems. When the image formation apparatus prints a webpage on which a map is drawn, text, other images and the like as well as the map are printed on a print sheet even if a user desires to print only the map on the print sheet. As a result, the map of interest is printed in a small size on the print sheet. Even if the user uses a large print sheet, images other than the map are printed on the print sheet or a large margin is formed on the print sheet, with the result that the map of interest is printed small in size on the print sheet similarly to the above case. Therefore, it is difficult for the user to grasp up to a detailed content of the printed map.

SUMMARY OF THE INVENTION

The present invention has been achieved to solve the conventional problems. It is an object of the present invention to provide an image formation apparatus capable of printing an image of an appropriate size according to a print sheet, a print method for the image formation apparatus and a print program for the image formation apparatus.

To attain the object, according to one aspect of the present invention, there is provided an image formation apparatus connected via a network to a server storing therein image data. The image formation apparatus includes: an acquisition unit for acquiring the image data from the server; a display unit for displaying first image data of a first image size based on the image data acquired by the acquisition unit; a printer for printing the image data on a recording medium; a setter for setting a size of the image data printed on the recording medium by the printer; and a specification unit for specifying second image data of a second image size corresponding to the first image data so that the printer prints on the recording medium the second image data of the size of the image data set by the setter. The acquisition unit acquires the second image data of the second image size specified by the specification unit. The printer prints the second image data of the size set by the setter.

It is preferable that the image formation apparatus further includes an acquisition mode setter for accepting from a user a setting of an acquisition mode for designating a standard of acquiring the second image data. It is also preferable that the specification unit specifies the second image data based on the acquisition mode set by the acquisition mode setter.

It is preferable that if the acquisition mode setter sets a first acquisition mode, the specification unit specifies image data of the second image size obtained by enlarging the first image data and increasing a scale as the second image data.

It is preferable that if the acquisition mode setter sets a second acquisition mode, the specification unit specifies image data of the second image size obtained by expanding a region indicated by the first image data as the second image data.

It is preferable that the image data is photograph data. It is also preferable that if the acquisition mode setter sets a first acquisition mode, the specification unit specifies image data of the second image size obtained by enlarging the first image data and increasing a resolution as the second image data.

It is preferable that the image data is photograph data. It is also preferable that if the acquisition mode setter sets a second acquisition mode, the specification unit specifies image data of the second image size obtained by expanding a region indicated by the first image data as the second image data.

It is preferable that the image data is map data.

It is preferable that the acquisition unit acquires the image data by using a web browser.

According to another aspect of the present invention, there is provided a print method for an image formation apparatus connected via a network to a server storing therein image data and including a display unit for displaying the image data and a printer for printing the image data on a recording medium. The print method includes the steps of: acquiring the image data from the server; displaying on the display unit first image data of a first image size based on the image data acquired in the step of acquiring; setting a size of the image data printed on the recording medium by the printer; specifying second image data of a second image size corresponding to the first image data so that the printer prints on the recording medium the second image data of the set size of the image data; acquiring the specified second image data of the second image size; and causing the printer to print the second image data of the set size.

It is preferable that the print method further includes the step of accepting from a user a setting of an acquisition mode for designating a standard of acquiring the second image data. It is also preferable that the step of specifying the second image data includes a step of specifying the second image data based on the set acquisition mode.

It is preferable that the image data is map data. It is also preferable that if a first acquisition mode is set, the step of specifying the second image data includes a step of specifying image data of the second image size obtained by enlarging the first image data and increasing a scale as the second image data.

It is preferable that the image data is map data. It is also preferable that if a second acquisition mode is set, the step of specifying the second image data includes a step of specifying image data of the second image size obtained by expanding a region indicated by the first image data as the second image data.

It is preferable that the image data is photograph data. It is also preferable that if a first acquisition mode is set, the step of specifying the second image data includes a step of specifying image data of the second image size obtained by enlarging the first image data and increasing a resolution as the second image data.

It is preferable that the image data is photograph data. It is also preferable that if a second acquisition mode is set, the step of specifying the second image data includes a step of specifying image data of the second image size obtained by expanding a region indicated by the first image data as the second image data.

It is preferable that the step of acquiring the image data includes a step of acquiring the image data by using a web browser. It is also preferable that the step of acquiring the second image data includes a step of acquiring the second image data by using the web browser.

According to yet another aspect of the present invention, there is provided a computer readable recording medium recording a print program executed by a computer of an image formation apparatus connected via a network to a server storing therein image data and including a display unit for displaying the image data and a printer for printing the image data on a recording medium. The print program causes the computer to execute the steps of: acquiring the image data from the server; displaying on the display unit first image data of a first image size based on the image data acquired in the step of acquiring; setting a size of the image data printed on the recording medium by the printer; specifying second image data of a second image size corresponding to the first image data so that the printer prints on the recording medium the second image data of the set size of the image data; acquiring the specified second image data of the second image size; and causing the printer to print the second image data of the set size.

According to the present invention, it is possible to provide an image formation apparatus capable of printing a user's desired image of an appropriate size according to a print region set by a user, a print method for the image formation apparatus and a print program for the image formation apparatus.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is an image view showing a data structure of a first correspondence table stored in a storage unit.

FIG. 7 is an image view showing a data structure of a second correspondence table stored in the storage unit.

DESCRIPTION OF THE PREFERRED EMBODIMENTS

Figure 1:
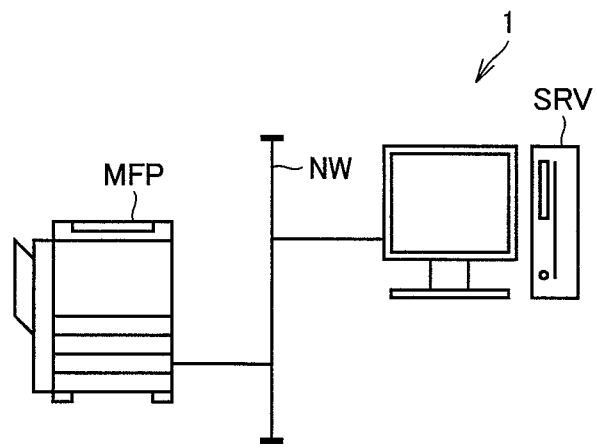
FIG. 1 is a schematic configuration diagram of an image formation system according to an embodiment of the present invention.

Embodiments of the present invention will be described hereinafter with reference to the accompanying drawings. Same or corresponding elements in the drawings are denoted by the same reference symbols and are not repeatedly described.

(Overall Configuration of Image Formation System)

FIG. 1 is a schematic configuration diagram of an image formation system 1 according to an embodiment of the present invention.

Referring to FIG. 1, image formation system 1 includes an image formation apparatus MFP, a network NW and a server SRV connected to image formation apparatus MFP via network NW.

Server SRV and image formation apparatus MFP are configured to be able to communicate data with each other via network NW. It is to be noted that network NW is constituted by a dedicated line such as a LAN (Local Area Network) or a WAN (Wide Area Network) or a public line such as the Internet or a virtual private network. Alternatively, a part of or all of network NW may be a wireless communication line such as a wireless LAN.

Image formation apparatus MFP is generally an MFP (Multi Function Peripheral) incorporating therein a plurality of functions such as a copier function, a facsimile function and a scanner function. Image formation apparatus MFP incorporates therein a web browser function. By using the Web browser function, image formation apparatus MFP acquires data stored in server SRV in response to a user's operation. Namely, by using the web browser function, image formation apparatus MFP transmits a request for acquiring user's desired data to server SRV. Further, image formation apparatus MFP performs an image formation processing based on the data acquired from server SRV. It is to be noted that the image formation processing includes printing of data on a paper medium, transmission of data by the facsimile function and the like. Image formation apparatus MFP according to the embodiment is configured to be connectable to server SRV such as a web server via network NW such as the Internet.

Server SRV is realized by an external web server or the like. A predetermined address for identifying server SRV is allocated to server SRV. Server SRV stores therein various types of content data such as image data of maps, photographs (map data, photograph data) and text data. Server SRV extracts image data of a requested image size in response to the request from image formation apparatus MFP, and transmits the extracted image data to image formation apparatus MFP.

In image formation system 1 configured as stated above, server SRV transmits website data including first image data such as the map data or photograph data requested by image formation apparatus MFP to image formation apparatus MFP.

Image formation apparatus MFP displays on the display unit a website including such an image as a map or a photograph based on the website data including the first image data such as the map data or the photograph data received from server SRV. Further, if receiving a print command to print such an image as a map or a photograph of a size up to a full size of a print sheet designated by a user, image formation apparatus MFP transmits a request of the map data or photograph data of an appropriate size to server SRV. More specifically, image formation apparatus MFP requests server SRV to transmit the map data or photograph data of an appropriate size according to the size of the print sheet so as to print the image such as the map or the photograph in either an entire printable area on the print sheet of the size designated by the user or an entire print designation area except for a designated margin.

Server SRV transmits second image data such as map data or photograph data according to a size requested by image formation apparatus MFP to image formation apparatus MFP. Image formation apparatus MFP prints such an image as a map or a photograph of a size up to the full designated size of the print sheet based on the second image data such as the map data or the photograph data received from server SRV.

Figure 2:
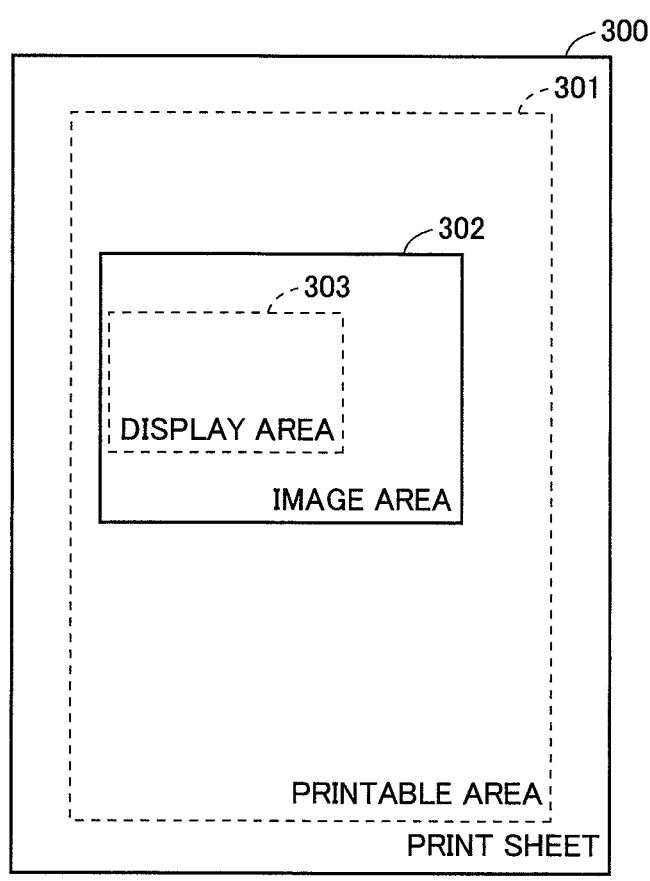
FIG. 2 is an image view showing a print sheet, a printable area, an image area and a display area.

FIG. 2 is an image view showing a print sheet 300 as well as a printable area 301, an image area 302 and a display area 303, in which image data is displayed, on print sheet 300. If image formation apparatus MFP receives the website data including the first image data such as the map data or the photograph data and prints the website including the image such as the map or the photograph on print sheet 300 based on the website data, then website contents are printed entirely in printable area 301 and the image such as the map or the photograph is printed in, for example, image area 302 as shown in FIG. 2. Therefore, image area 302 is smaller than printable area 301. It is to be noted that the first image data is image data displayed in a region indicated by display area 303.

Image formation apparatus MFP according to the embodiment can display website contents. More specifically, by user's using a scroll bar or the like, image formation apparatus MFP can display a user's desired area (display area 303) out of the website contents on the display unit or the like. Further, image formation apparatus MFP according to the embodiment requests server SRV to transmit the second image data to image formation apparatus MFP so as to print the image data (first image data) corresponding to the area displayed on the display unit to correspond to a user's designated sheet size. Image formation apparatus MFP can thereby acquire the second image data of a size corresponding to the user's designated sheet size and print the image such as the map or photograph entirely in printable area 301 based on the second image data.

Image formation apparatus MFP may acquire second image data for an instance of making a lengthwise direction of display area 303 correspond to a lengthwise direction of printable area 301. Alternatively, image formation apparatus MFP may acquire second image data for an instance of making a longitudinal direction (or a lateral direction) of display area 303 correspond to a longitudinal direction (or a lateral direction) of printable area 301.

Configurations for realizing the functions stated above will now be described in detail.

(Hardware Configuration of Image Formation Apparatus MFP)

Figure 3:
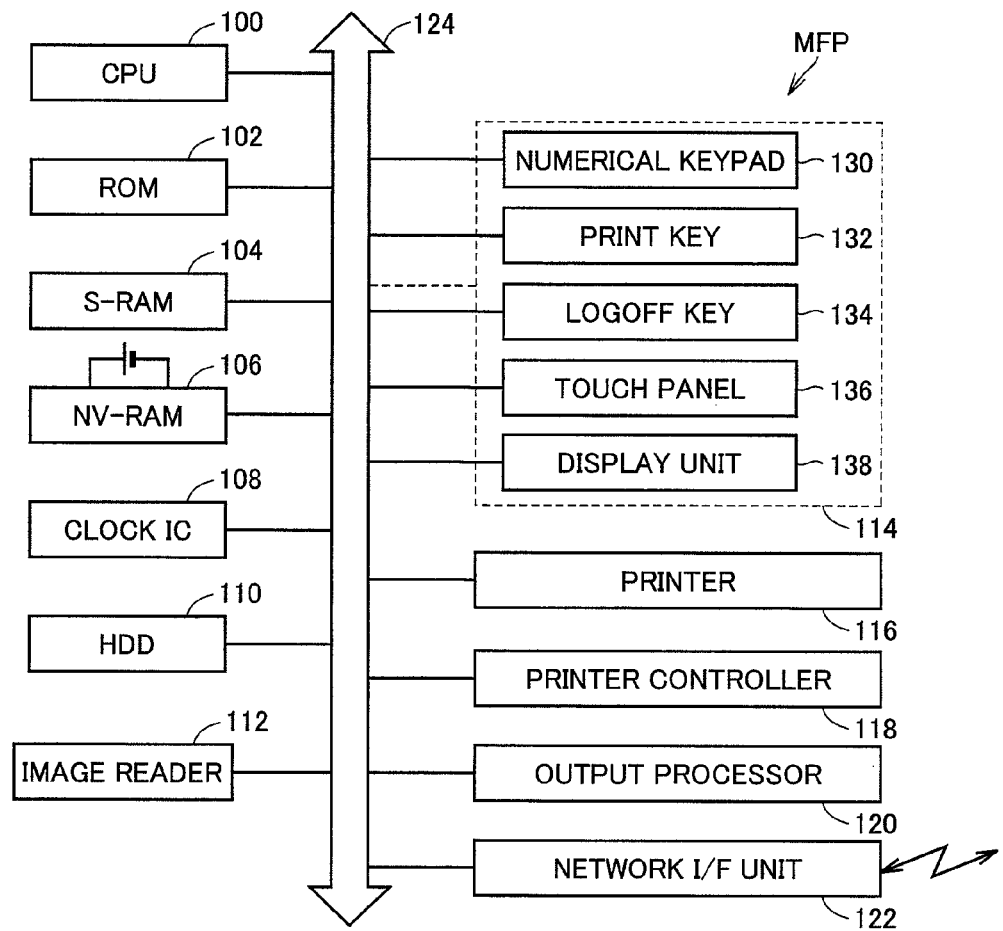
FIG. 3 is a pattern diagram showing a schematic hardware configuration of an image formation apparatus according to the embodiment of the present invention.

FIG. 3 is a pattern diagram showing a schematic hardware configuration of image formation apparatus MFP according to the embodiment of the present invention.

Referring to FIG. 3, image formation apparatus MFP includes a CPU (Central Processing Unit) 100, a ROM (Read Only Memory) 102, an S-RAM (Static-Random Access Memory) 104, an NV-RAM (Non-Volatile Random Access Memory) 106 and a clock IC (Integrated Circuit) 108. The constituent elements of image formation apparatus MFP are connected to one another via a bus 124.

CPU 100 realizes processings according to the embodiment by reading a program stored in ROM 102 or the like in advance to S-RAM 104 serving as a working memory and executing the program. NV-RAM 106 stores therein various settings related to an image formation processing performed by image formation apparatus MFP in a nonvolatile fashion. Clock IC 108 is configured to include a quartz oscillator or the like and measures a current time.

Image formation apparatus MFP also includes an image reader 112, an operation panel 114, a printer 116, a print controller 118 and an output processor 120.

Image reader 112 that is an element realizing the scanner function reads an original and generates image data. Although not shown, image reader 112 includes a mounting base on which originals are set, a original base glass, a transporter transporting the originals set on the mounting base to the original base glass one by one and a discharge base for discharging the read originals.

Operation panel 114 includes a numerical keypad 130, a PRINT key 132, a logoff key 134, a touch panel 136 and a display unit 138 and is arranged at a position, at which a user can easily operate operation panel 114, on an upper surface of image formation apparatus MFP. Numerical keypad 130, PRINT key 132, logoff key 134 and touch panel 136 function as an input unit accepting user's operation. Display unit 138 displays a screen for encouraging the user to make various settings or various selections. Display unit 138 displays a website or the like based on data such as website data downloaded from server SRV. Display unit 138 is constituted by, for example, a liquid crystal panel and touch panel 136 is arranged on a display surface of display unit 138.

Printer 116 is an element performing a print processing for printing an image on a paper medium or the like. Printer 116 includes an imaging unit that is constituted by an exposure, developing rollers and the like, transfer rollers that transfer a toner image formed by the imaging unit onto the paper medium, a fixer that fixes the transferred toner image, a control circuit that controls operations performed by respective elements and the like. Printer 116 prints a map or a photograph on a print sheet of a user's designated size.

Printer controller 118 converts print data (conversion data) from server SRV or a personal computer or image data read by image reader 112 into a data suitable for the print processing performed by printer 116. If image formation apparatus MFP is a color image formation apparatus, printer controller 118 converts the print data (conversion data) or other image data into raster data of four colors of yellow (Y), magenta (M), cyan (C) and black (K) and outputs raster data of respective colors to printer 116. It is to be noted that image formation apparatus MFP may be a black-and-white image formation apparatus or may be configured to select one of a black-and-white print type and a color print type so as to execute the selected print type.

Output processor 120 is an element performing processings on the paper medium after the printer 116 forms an image on the paper medium. Output processor 120 mainly executes such processings as "sorting", "grouping", "stapling" and "punching". The "sorting" means herein so-called collating printing. The "grouping" is a processing for outputting a plurality of set copies of paper mediums per page of a document. The "stapling" is a processing for securing output paper mediums by staples. The "punching" is a processing for forming staple holes in the output paper mediums.

Image formation apparatus MFP further includes a hard disk drive (HDD) 110, a network interface (I/F) unit 122. HDD 110 is a storage unit storing therein relatively high-capacity data in a nonvolatile fashion. HDD 110 stores therein map data or photograph data from server SRV, image data read by image reader 112 and the like in a nonvolatile fashion. Network I/F unit 122 is an element for communicating data between server SRV and a personal computer via network NW.

(Hardware Configuration of Server SRV)

Figure 4:
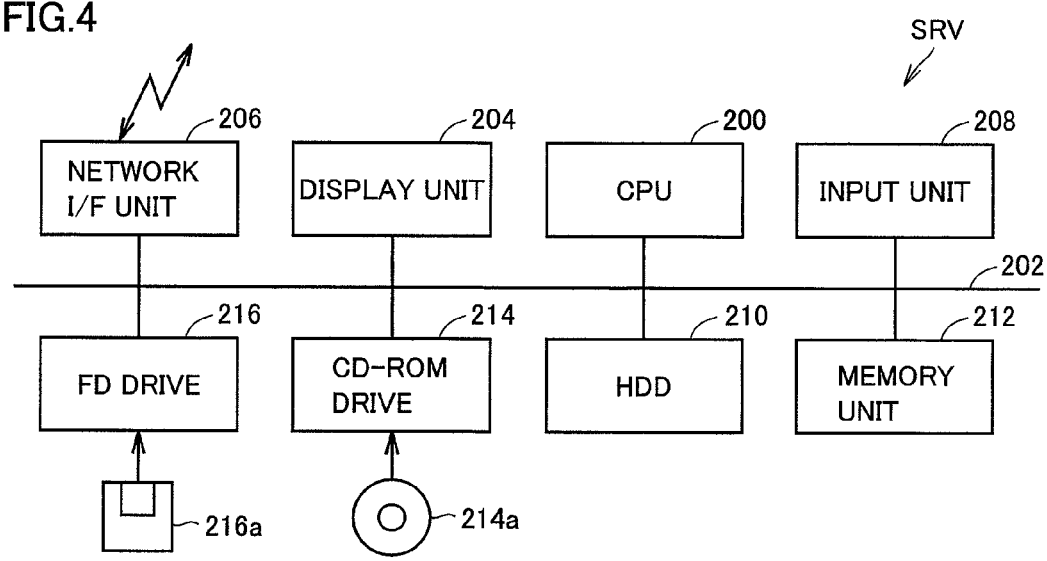
FIG. 4 is a pattern diagram showing a schematic hardware configuration of a server according to the embodiment of the present invention.

FIG. 4 is a pattern diagram showing a schematic hardware configuration of server SRV according to the embodiment of the present invention.

Referring to FIG. 4, server SRV includes a CPU 200 executing various programs including an operating system, a memory unit 212 temporarily storing therein data necessary for CPU 200 to execute each program and a hard disk drive (HDD) 210 storing therein a program executed by CPU 200 in a nonvolatile fashion. Such a program is read by a CD-ROM (Compact Disk-Read Only Memory) drive 214 or a flexible disk (FD) drive 216 from a CD-ROM 214a or a flexible disk 216a, respectively.

HDD 210 stores therein a plurality of content data such as a plurality of map data different in degree of detail and a plurality of photograph data different in degree of detail. HDD 210 stores therein image data so that a part of the image data is extractable. Namely, CPU 200 receives designation of a degree of detail, designation of center coordinates and designation of an image size and selects image data such as map data or photograph data according to the designated degree of detail from the image data stored in HDD 210. CPU 200 extracts image data of an image size designated while centering around the designated center coordinates out of the image data stored in HDD 210.

In this case, a plurality of map data different in degree of detail is, for example, a plurality of types of map data different in scale or resolution. Larger-scale map data includes more detailed map information (such as more detailed image data or text data). A plurality of photograph data different in degree of detail is a plurality of types of photograph data different in, for example, scale or resolution. Larger-scale photograph data includes finer image information.

CPU 200 receives a user's operation request via an input unit 208 constituted by a keyboard, a mouse and the like and outputs a screen output generated by execution of a program to display unit 204. Further, CPU 200 communicates data with image formation apparatus MFP via network I/F unit 206 constituted by a LAN card or the like. These constituent elements of server SRV are connected to one another via an internal bus 202.

Network I/F unit 206 receives data (such as a request message) transmitted from image formation apparatus MFP via network NW. CPU 200 reads image data such as map data or photograph data requested by image formation apparatus MFP from HDD 210 and transmits the read image data to image formation apparatus MFP via network I/F unit 206. For example, CPU 200 extracts image data of a designated image size centering around designated coordinates from HDD 210 in response to the request message including the designated image size and the designated coordinates from image formation apparatus MFP, and transmits the image data to image formation apparatus MFP.

Functional configurations of image formation apparatus MFP and server SRV will next be described in detail.

(Functional Configuration of Image Formation Apparatus MFP)

Figure 5:
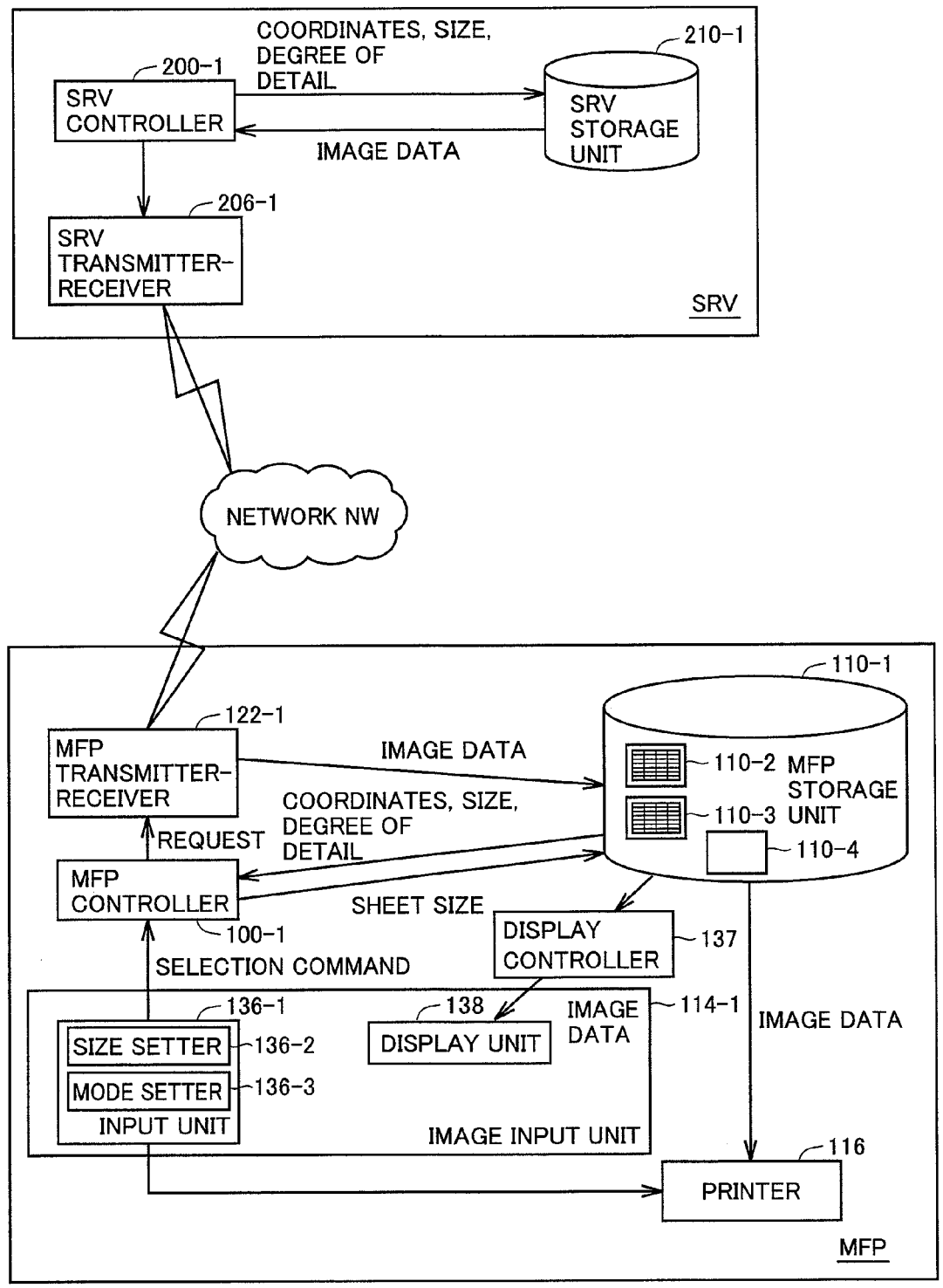
FIG. 5 is a block diagram showing functional configurations of the image formation apparatus and the server according to the embodiment of the present invention.

FIG. 5 is a block diagram showing functional configurations of image formation apparatus MFP and server SRV according to the embodiment of the present invention. Referring to FIG. 5, image formation apparatus MFP includes an MFP storage unit 110-1, an input unit 136-1, display unit 138, an MFP controller 100-1, an MFP transmitter-receiver 122-1 and printer 116.

Image formation apparatus MFP accepts a print mode selection command and changes a print mode to one of a magnification-preferred mode and a region-preferred mode when a website or the like including the first image data is displayed on display unit 138. In the magnification-preferred mode, image formation apparatus MFP transmits a request of second image data that is more detailed data obtained by enlarging the image (first image data) displayed on display unit 138 according to a degree-of-detail change ratio corresponding to a designated sheet size to server SRV. Image formation apparatus MFP prints an image based on the second image data received from server SRV. In the region-preferred mode, image formation apparatus MFP transmits a request of second image data representing wider area than an area represented by the first image data without changing the degree of detail of the image data to server SRV. Image formation apparatus MFP prints an image based on the second image data received from server SRV.

In this case, the magnification-preferred mode is similarly a mode selected if the user desires to print map data including more detailed map information on a displayed map for map data displayed on display unit 138 without changing the area of displayed map. The region-preferred mode is a mode selected if the user desires to print map data on a wider map for an area represented by the map data displayed on display unit 138 without changing the scale (degree of detail) of the displayed map data.

MFP storage unit 110-1 is formed in a predetermined region of either HDD 110 or NV-RAM 106. MFP storage unit 110-1 stores therein image data, text data and the like received by MFP transmitter-receiver 122-1. MFP storage unit 110 stores therein a first correspondence table 110-2. In first correspondence table 110-2, a size change ratio that indicates a ratio of a size of each print sheet to a size of display unit 138, a scale change ratio that indicates a ratio of changing a scale of image data according to the size change ratio and an image size of the second image data requested to server SRV are stored while being made to correspond to the size of each print sheet. MFP storage unit 110 also stores therein a second correspondence table 110-3. In second correspondence table 110-3, a size change ratio that indicates the ratio of the size of each print sheet to the size of display unit 138 and the image size of the second image data requested to server SRV are stored while being made to correspond to the size of each print sheet. MFP storage unit 110-1 further stores therein screen information 110-4 that includes image data, text data and a display position of each of the image data and the text data used when a web browser is activated.

First correspondence table 110-2 is a table storing therein the size change ratio, the scale change ratio and the image size to enlarge the image (first image data) displayed on display unit 138 and print the enlarged image up to a full printable area of a designated size. Specifically, first correspondence table 110-2 is a table storing therein a ratio of a magnitude of each sheet size to a magnitude of a display region of display unit 138 as the size change ratio and a ratio of changing a scale of image data according to the size change ratio as the scale change ratio while making the size change ratio and the scale change ratio correspond to each sheet size. An image size indicates a longitudinal length (the number of longitudinal dots) and a horizontal length (the number of horizontal dots) of the size-changed image data (second image data). However, CPU 100 may be configured to calculate coordinates of vertexes indicating an area of image data of interest.

Generally, "to enlarge an image" means herein to change the scale (degree of detail) of an image without changing an area represented by the image or irrespectively of whether or not the area represented by the image is changed. In the embodiment of the present invention, "to enlarge an image" means to enlarge an image corresponding to an area of the image (first image data) displayed on display unit 138 or to greatly change the scale of the image and to generate a more detailed image included in the area of the image without changing the area represented by the image.

Second correspondence table 110-3 is a table storing therein the size change ratio and the image size to enlarge the image (first image data) displayed on display unit 138 and to print the enlarged image up to a full size of a designated sheet. Specifically, second correspondence table 110-3 is a table storing therein the ratio of the magnitude of each sheet size to the magnitude of the display region of display unit 138 as the size change ratio while making the size change ratio correspond to each sheet size. The image size indicates the longitudinal length (the number of longitudinal dots) and the horizontal length (the number of horizontal dots) of the size-changed image data (second image data). However, CPU 100 may be configured to calculate coordinates of vertexes indicating the area of image data of interest.

Generally, "to enlarge the image area" means herein to enlarge an area of an image of interest without changing the scale (degree of detail) or irrespectively of whether or not the scale (degree of detail) is changed. In the embodiment of the present invention, "to enlarge an image" means to enlarge the image (first image data) displayed on display unit 138 up to the magnitude of a printable area of a sheet of a designated size at the same scale (degree of detail) as that of the image displayed on display unit 138.

First correspondence table 110-2 and second correspondence table 110-3 according to the embodiment of the present invention will be described in more detail. For sake of description, the size of the display region of display unit 138 is assumed as 148.4 millimeters (mm)×105 mm.

FIG. 6 is an image view showing a data structure of first correspondence table 110-2 stored in MFP storage unit 110-1. As shown in FIG. 6, first correspondence table 110-2 stores therein the size of each print sheet, the size change ratio, the scale change ratio (degree-of-detail change ratio) and coordinates (image size) indicating image data (second image data) requested to server SRV while being made to correspond to one another.

Since the size of the display region of display unit 138 according to the embodiment of the present invention is 148.4 mm×105 mm, it is necessary to enlarge the image (first image data) displayed on display unit 138 by 1.7 times (=257 mm/148.4 mm) so as to print the image (first image data) displayed in the display region of display unit 138 on a B5 (182 mm×257 mm) print sheet. CPU 100 transmits a request of image data (second image data) enlarged to be 1.7 times as large as the image area displayed on display unit 138 to server SRV via MFP transmitter-receiver 122-1. Namely, CPU 100 transmits a request of the image data (second image data) obtained by multiplying the scale of the image (first image data) in the image area displayed in display unit 138 by 1.7 to server SRV. For example, if the scale of the image (first image data) displayed on display unit 138 is $1/1000$, image formation apparatus MFP transmits a request of image data (second image data) at a scale of $1/588$ ($1/1000 \times 1.7$) to server SRV.

CPU 100 also transmits center coordinates of the image displayed on display unit 138, a X-direction (lateral) length (width) from the center coordinates and Y-direction (longitudinal) length (height) from the center coordinates to server SRV via MPF transmitter-receiver 122-1. Namely, CPU 100 transmits an area (information) to server SRV as a requested image area (second image size). The range of the area in X direction (lateral direction) is within 89.25 millimeters (mm) from the center coordinates of the requested image displayed on display unit 138 and corresponding to a size of a printable area or a print designation area of a designated sheet size. The range of the area in Y direction (longitudinal direction) is within 126 mm from the center coordinates. Alternatively, CPU 100 may calculate coordinates of four corners of the image area based on the center coordinates of the image displayed on display unit 138 while referring to first correspondence table 110-2. Further, CPU 100 may transmit a scale and the coordinates of the four corners serving as data indicating the second image size to server SRV via MFP transmitter-receiver 122-1.

In this way, CPU 100 can acquire the coordinates of the image area (second image size) that is according to the designated sheet size and that is to be requested to server SRV while referring to first correspondence table 110-2.

FIG. 7 is an image view showing a data structure of second correspondence table 110-3 stored in MFP storage unit 110-1. As shown in FIG. 7, second correspondence table 110-3 stores therein the size of each print sheet, the size change ratio and coordinates (second image size) indicating image data (second image data) requested to server SRV while being made to correspond to one another.

Since the size of the display region of display unit 138 according to the embodiment of the present invention is 148.4×105 mm, it is necessary to enlarge the image area displayed on display unit 138 by 1.7 times so as to print the image (first image data) displayed in the display region of display unit 138 on a B5 (182 mm×257 mm) print sheet at the same scale (degree of detail) as that of the image (first image data) displayed on display unit 138. CPU 100 transmits a request of an image area (a second image size) enlarged to be 1.7 times as large as the image area (first image size) displayed on display unit 138 to server SRV via MFP transmitter-receiver 122-1.

Specifically, CPU 100 transmits the center coordinates of the image displayed on display unit 138, the X-direction (lateral) length (width) and the Y-direction (longitudinal) length (height) from the center coordinates with the same scale as that of the first image data previously received from server SRV to server SRV via MFP transmitter-receiver 122-1. Namely, CPU 100 transmits an area (information) to server SRV as a requested image area (second image size). The range of the area in X direction (lateral direction) is within 89.25 millimeters (mm) from the center coordinates of the requested image displayed on display unit 138 and corresponding to a size of a printable area or a print designation area of a designated sheet size. The range of the area in Y direction (longitudinal direction) is within 126 mm from the center coordinates. Alternatively, CPU 100 may calculate coordinates of four corners of the image area based on the center coordinates of the image displayed on display unit 138 while referring to second correspondence table 110-3. Further, CPU 100 may transmit the same scale as that of the first image data and the coordinates of the four corners serving as data indicating the second image size to server SRV via MFP transmitter-receiver 122-1.

In this way, CPU 100 can acquire the coordinates of the image area (second image size) that is according to the designated sheet size and that is to be requested to server SRV while referring to second correspondence table 110-3.

Referring back to FIG. 5, MFP controller 100-1 is realized by causing CPU 100 to read the program stored in ROM 102, HDD 110 or the like in advance to S-RAM 104 and to execute the program. MFP controller 100-1 accepts a print command including designation of a sheet size input via touch panel 136. MFP controller 100-1 reads the second image size corresponding to the selected sheet size from MFP storage unit 110-1. MFP controller 100-1 transmits a request of the second image data corresponding to the second image size to server SRV via MFP transmitter-receiver 122-1.

More specifically, MFP controller 100-1 accepts a print mode selection command input from the user via input unit 136-1 and changes the print mode to either the magnification-preferred mode (first print (image acquisition) mode) or the region-preferred mode (second print (image acquisition) mode).

In the magnification-preferred mode, MFP controller 100-1 reads the second image size and the degree-of-detail change ratio corresponding to a sheet size from first correspondence table 110-2 stored in MFP storage unit 110-1. MFP controller 100-1 transmits a request of the more detailed second image data on an image enlarged to have the second image size from the image displayed on display unit 138 according to the degree-of-detail change ratio to server SRV via MFP transmitter-receiver 122-1.

In the region-preferred mode, MFP controller 100-1 reads the second image size corresponding to a sheet size from second correspondence table 110-3 stored in MFP storage unit 110-1. Further, MFP controller 100-1 transmits a request of the second image data of the second image size representing a wider area than an area represented by the first image data to server SRV via MFP transmitter-receiver 122-1.

Alternatively, MFP controller 100-1 may be configured to always transmit a request of image data on the largest sheet size (A3 size) to server SRV when accepting the print command including designation of the sheet size. In this case, when image formation apparatus MFP receives the second image data, CPU 100 extracts image data centering around the first image data and according to the user's selected sheet size from the image data received from server SRV and sets the extracted image data as the second image data.

In this way, MFP controller 100-1 functions as a specification unit specifying the second image data of the second image size so that printer 116 can print the second image data corresponding to the first image data on a sheet (recording medium) of an image data size set by a size setter 136-2.

Display unit 138 and input unit 136-1 are realized by operation panel 114. Display unit 138 and input unit 136-1 constitute a display input unit 114-1. Display unit 138 displays an image and a text based on HTML data or the like received from external server SRV via, for example, network NW and MFP transmitter-receiver 122-1. Display unit 138 displays an image based on the first image data from server SRV.

More specifically, a display controller 137 realized by CPU 100, a control program and the like reads screen information 110-4 stored in MFP storage unit 110-1 and controls display unit 138 to display a website or the like via the web browser. Namely, display controller 137 controls designated text and image to be displayed at designated positions, respectively on display unit 138 based on image data, text data and display positions of the image data and the text data included in screen information 110-4, image data, text data and display positions of the image data and the text data downloaded from server SRV and the like.

Input unit 136-1 is realized by numerical keypad 130, PRINT key 132, logoff key 134, touch panel 136 and the like. Input unit 136-1 accepts an image display command, various print-related settings and the like. The image display command includes not only a command to display the image and the text corresponding to the image data and the text data already stored in MFP storage unit 110-1 but also a command to acquire image data and text data from server SRV via network NW and to display the acquired image and text.

In this way, input unit 136-1 includes a function as size setter 136-2 setting the size of the image data printed on the recording medium by printer 116 and a function as mode setter 136-3 accepting the setting of the print mode (image acquisition mode) by user's selecting a standard of acquiring the second image data.

Figure 8:
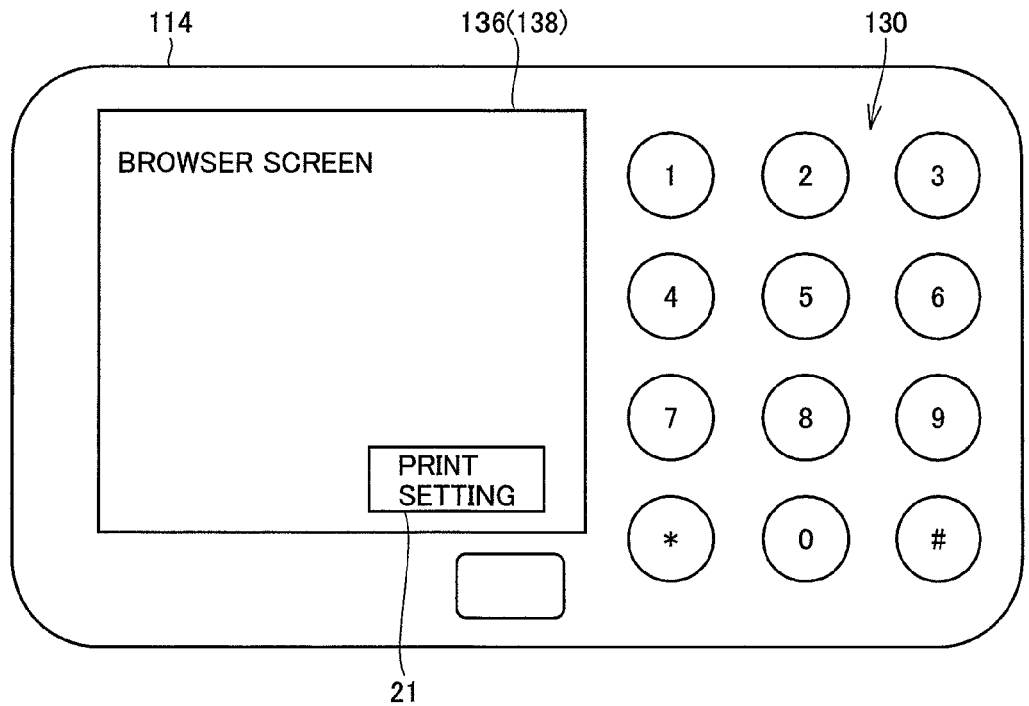
FIG. 8 is an image view showing a state in which a display unit displays data received from the server.

FIG. 8 is an image view showing a state of displaying data received from server SRV on the web browser of display unit 138. As shown in FIG. 8, display controller 137 controls display unit 138 to display a website downloaded from server SRV and a print setting button 21 based on the image data, the text data and the display positions of the image data and the text data, respectively included in screen information 110-4, the image data, the text data and the display positions of the image data and the text data, respectively downloaded from server SRV and the like. If the user operates the scroll bar and an arrow key that are not shown to display desired parts of the downloaded image and text on display unit 138 and depresses print setting button 21, CPU 100 accepts a print setting command and display unit 138 displays a selection screen for selecting a sheet size. In response to depression of print setting button 21, MFP controller 100-1 acquires the center coordinates of the image displayed on display unit 138 and stores the acquired center coordinates in S-RAM 104 or the like.

Figure 9:
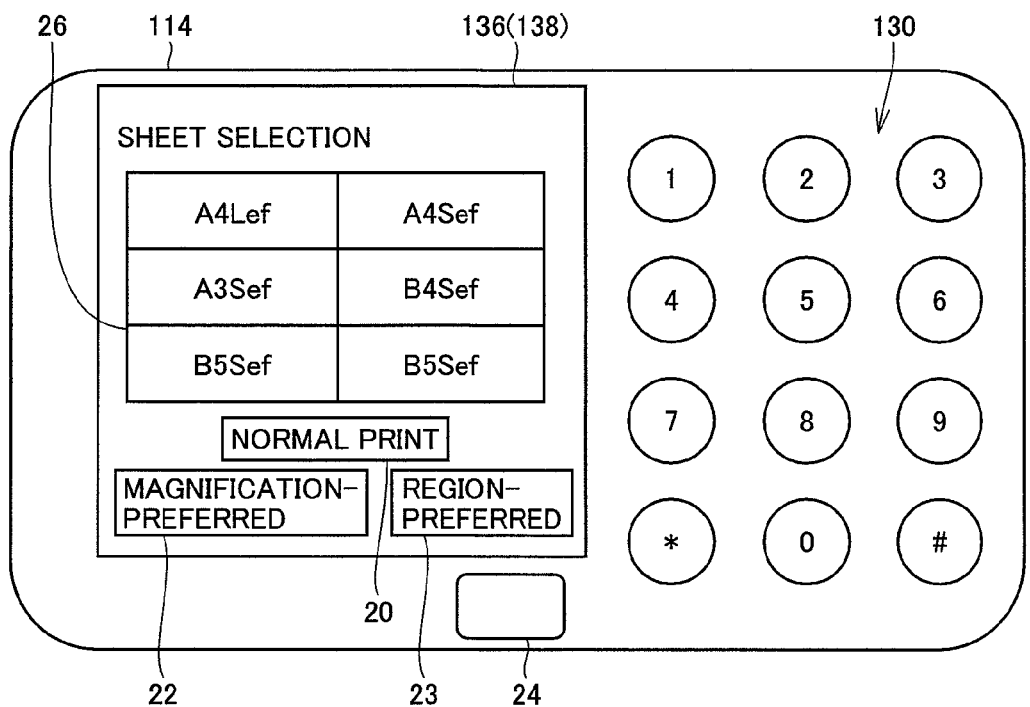
FIG. 9 is an image view showing a print setting screen of the display unit.

FIG. 9 is an image view showing a print setting screen on display unit 138. As shown in FIG. 9, display controller 137 displays a print setting screen for accepting selection of a sheet size (print image size) via display unit 138 based on screen information 110-4. Display controller 137 displays a print setting screen for accepting one of a normal print mode, the magnification-preferred mode and the region-preferred mode via display unit 138 based on screen information 110-4. Specifically, display controller 137 displays various sheet size buttons 26, a normal print button 20, a magnification-preferred button 22 and a region-preferred button 23 on display unit 138. The user selects a desired sheet size and then depresses normal print button 20, magnification-preferred button 22 or region-preferred button 23. Namely, input unit 136-1 accepts a sheet size selection command and a print mode selection. A start key 24 and the like are also provided in input unit 136-1 and printer 116 starts printing an image by depression of start key 24.

In this way, upon receiving the designation of the sheet size, the designation of one of the normal print mode, the magnification-preferred mode and the region-preferred mode and designation of the center coordinates of the image, MFP controller 100-1 reads the second image size corresponding to the selected sheet size from MFP storage unit 110-1. Further, MFP controller 100-1 transmits the request of the image data of the second image size to server SRV via MFP transmitter-receiver 122-1.

Printer 116 prints an image on a sheet of the sheet size set on the print setting screen based on the second image data received from server SRV.

(Functional Configuration of Server SRV)

Referring to FIG. 5, server SRV includes an SRV storage unit 210-1, an SRV controller 200-1 and an SRV transmitter-receiver 206-1.

SRV storage unit 210-1 is realized by HDD 210. As already stated, SRV storage unit 210-1 stores therein a plurality of types of image data such as map data and photograph data.

SRV transmitter-receiver 206-1 is realized by CPU 200, network I/F unit 206 and the like, communicates data with image formation apparatus MFP via network NW such as the Internet.

SRV controller 200-1 extracts the first image data in the first image size from the image data stored in SRV storage unit 210-1 in response to a request of transmission of the first image data including transmission of the first image size from image formation apparatus MFP. SRV controller 200-1 controls SRV transmitter-receiver 206-1 to transmit the extracted first image data to image formation apparatus MFP via network NW.

SRV controller 200-1 extracts the second image data of the second image size from the image data stored in SRV storage unit 210-1 in response to a request of transmission of the second image data including transmission of the second image size from image formation apparatus MFP. SRV controller 200-1 controls SRV transmitter-receiver 206-1 to transmit the extracted second image data to image formation apparatus MFP via network NW.

(Image Print Processing Performed in Image Formation System 1)

Figure 10:
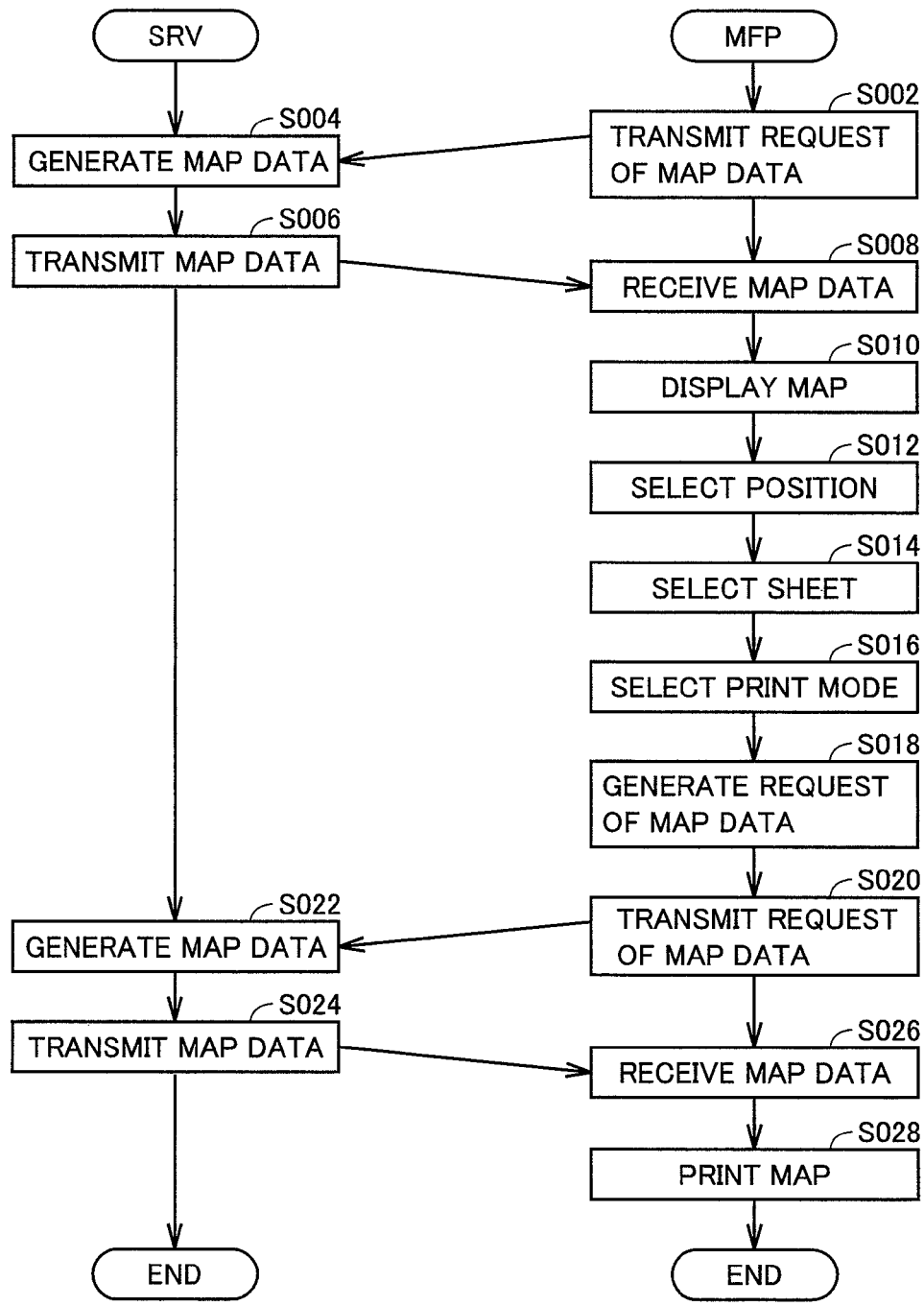
FIG. 10 is a sequence diagram showing processing procedures of an image print processing performed in the image formation system.

FIG. 10 is a sequence diagram showing processing procedures of an image print processing performed in image formation system 1. An overall processing will now be described while referring to an instance in which image formation apparatus MFP receives map data from server SRV and prints a map up to a full size of a print sheet.

As shown in FIG. 10, CPU 100 of image formation apparatus MFP acquires position coordinates (such as center coordinates) and a scale of a user's desired map, and transmits a request message for requesting map data (first image data) of a predetermined size (first image size) to server SRV via network I/F unit 122 (step S002).

Server SRV receives the request message and extracts the map data (first image data) requested by image formation apparatus MFP from HDD 210 (step S004). Server SRV transmits data such as a website including the map data (first image data) to image formation apparatus MFP (step S006).

Image formation apparatus MFP receives the data on the website including the map data (first image data) (step S008). Display unit 138 of image formation apparatus MFP displays information on the website including a map (step S010). The user causes a part the user desires to be printed (first image data) to be displayed on display unit 138 of image formation apparatus MFP (step S012). Namely, CPU 100 acquires the position coordinates of the map desired to be printed and stores the position coordinates of the map in S-RAM 104 (step S012). The user selects a desired sheet size (print image size) of which size the user desires to print an image via touch panel 136 of image formation apparatus MFP (step S014). Namely, CPU 100 accepts the desired sheet size of which size the user desires to print an image (step S014). The user selects one of the normal print mode, the magnification-preferred mode and the region-preferred mode via touch panel 136 of image formation apparatus MFP (step S016). Namely, CPU 100 accepts selection of the print mode (step S016). CPU 100 calculates the scale (degree of detail) of the map and the area (second image size) of the requested image data from MFP storage unit 110-1 according to the input position coordinates, sheet size and print mode, and generates a request message for requesting the map data (second image data) (step S018). CPU 100 transmits the request message for requesting the map data (second image data) to server SRV via network I/F unit 122 (step S020).

Server SRV receives the request message and generates the user's desired map data (second image data) from HDD 210 (step S022). Server SRV transmits the map data (second image data) to image formation apparatus MFP (step S024).

Image formation apparatus MFP receives the map data (second image data) (step S026). Printer 116 of image formation apparatus MFP prints a map on a sheet of the designated size (print image size) based on the map data (second image data) (step S028).

(Image Print Processing Performed by Image Formation Apparatus MFP)

Figure 11:
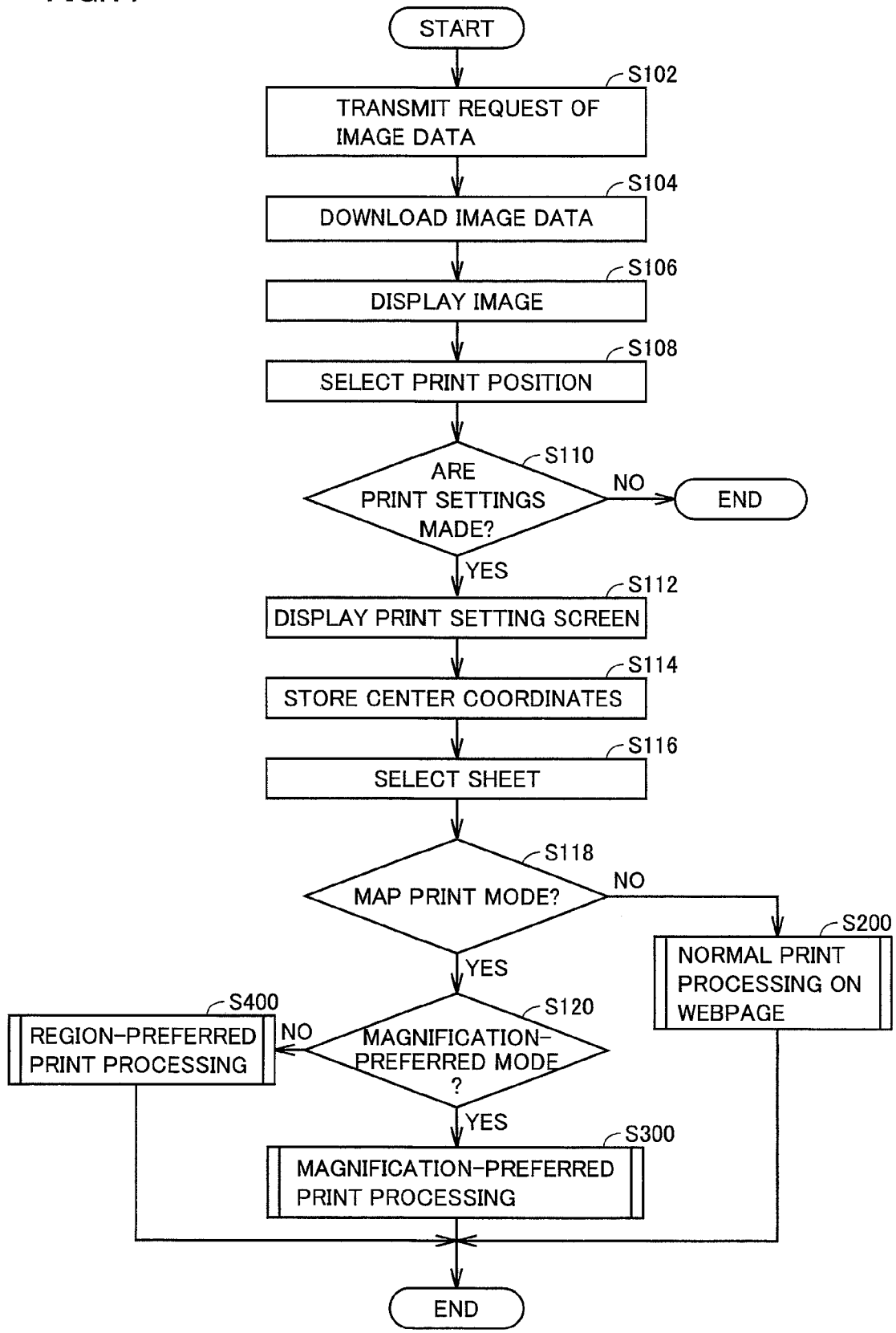
FIG. 11 is a flowchart showing processing procedures of an image print processing performed by the image formation apparatus.

FIG. 11 is a flowchart showing processing procedures of the image print processing performed by image formation apparatus MFP. The image print processing performed by image formation apparatus MFP will now be described while referring to an instance in which image formation apparatus MFP receives the map data from server SRV and prints a map to a full printable area of a sheet of a designated sheet size.

As shown in FIG. 11, CPU 100 of image formation apparatus MFP acquires the position coordinates (center coordinates) of the user's desired map and transmits the request message for requesting the map data (first image data) of the predetermined size (first image size) to server SRV via network I/F unit 122 (step S102).

Image formation apparatus MFP receives the data on the website including the map data (first image data) (step S104). Display unit 138 of image formation apparatus MFP displays the information on the website including the map (step S106).

The user causes display unit 138 of image formation apparatus MFP to display the desired part (first image data) the user desires to be printed (step S108).

When the user inputs a request of making print settings to touch panel 136, that is, CPU 100 accepts the request of accepting print settings via touch panel 136 (YES in step S110), display unit 138 displays the print setting screen (step S112). At this time, CPU 100 acquires the position coordinates of the map the user desires to be printed and stores the acquired position coordinates of the map in S-RAM 104 (step S114).

The user selects the desired sheet size (step S116). Namely, CPU 100 accepts a command to select the sheet size (print image size) from the user and stores the designated sheet size in S-RAM 104 (step S116). The user selects one of the normal print mode, the magnification-preferred mode and the region-preferred mode via touch panel 136 of image formation apparatus MFP. Upon accepting the selection of the print mode, CPU 100 determines whether or not a map print mode (magnification-preferred mode or region-preferred mode) is selected (step S118).

If the user selects the normal print mode (the user does not select the map print mode) (NO in step S118), CPU 100 executes a normal print processing (step S200). If the user selects the map print mode (magnification-preferred mode or region-preferred mode) (YES in step S118), CPU 100 determines whether or not the magnification-preferred mode is selected (step S120). If the user selects the magnification-preferred mode (YES in step S120), CPU 100 executes a magnification-preferred print processing (step S300). If the user selects the region-preferred mode (NO in step S120), CPU 100 executes a region-preferred print processing (step S400).

(Normal Print Processing Performed by Image Formation Apparatus MFP)

Figure 12:
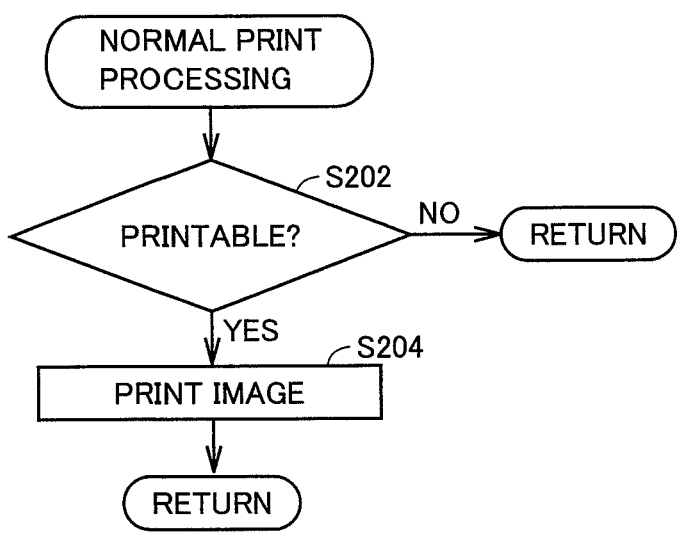
FIG. 12 is a flowchart showing processing procedures of a normal print processing performed by the image formation apparatus.

FIG. 12 is a flowchart showing processing procedures of the normal print processing performed by image formation apparatus MFP. As shown in FIG. 12, in the normal print processing (step S200), CPU 100 determines whether or not printer 116 is in a printable state (step S202). If printer 116 is in the printable state (YES in step S202), printer 116 performs a normal print processing on the sheet of the designated size (step S204).

(Magnification-Preferred Print Processing Performed by Image Formation Apparatus MFP)

Figure 13:
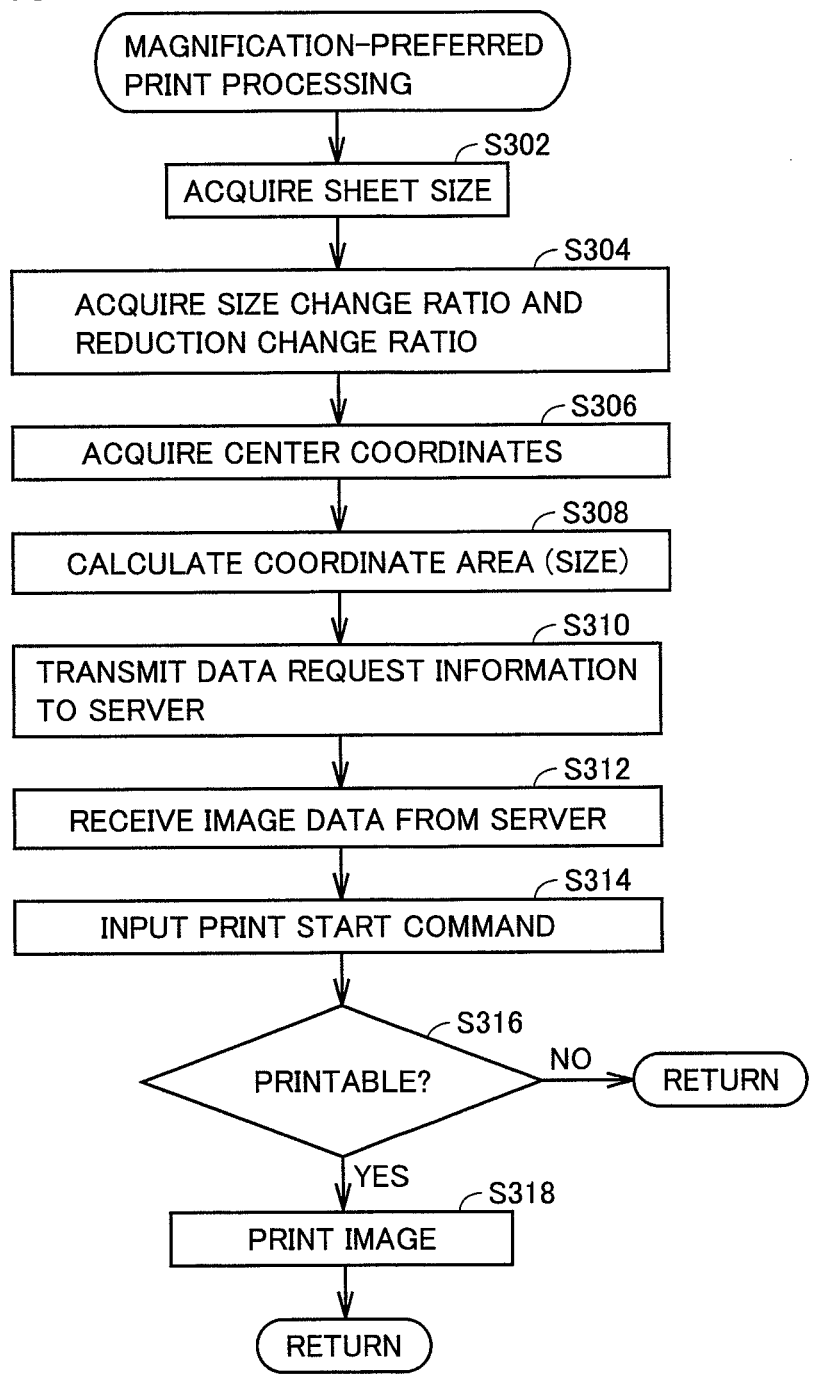
FIG. 13 is a flowchart showing processing procedures of a magnification-preferred print processing performed by the image formation apparatus.

FIG. 13 is a flowchart showing processing procedures of the magnification-preferred processing performed by image formation apparatus MFP. As shown in FIG. 13, in the magnification-preferred processing (step S300), CPU 100 reads a sheet size stored in S-RAM 104 (step S302) and acquires the size change ratio and the scale ratio (value indicating the degree of detail) corresponding to the sheet size from first correspondence table 110-2 stored in MFP storage unit 110-1 (step S304). CPU 100 reads the position coordinates stored in S-RAM 104 (step S306), calculates the X-direction (lateral) length (width) and the Y-direction (longitudinal) length (height) of the image area and acquires the image area (second image size) (step S308). Namely, CPU 100 calculates the X-direction length and the Y-direction length of the image area as the second image size.

Alternatively, CPU 100 may read the position coordinates stored in S-RAM 104 (step S306) and calculate coordinates of X-direction (lateral) ends and those of Y-direction (longitudinal) ends of the image area centering around the position coordinates (step S308). Coordinates of four corners of the image area as the second image size are decided by the coordinates of the X-direction (lateral) ends and those of the Y-direction (longitudinal) ends of the image area centering around the position coordinates.

For example, if the size of the display region of display unit 138 is 148.4 mm×105 mm and a A4 size (210 mm×297 mm) is selected as the print sheet size, CPU 100 acquires 2.0 as the scale (degree-of-detail) change ratio from MFP storage unit 110-2 (step S304). CPU 100 reads the center coordinates of the image displayed on display unit 138 from S-RAM 104 (step S306) and calculates an X-direction length of 210 mm and a Y-direction length of 297 mm of the image area (step S308). Alternatively, CPU 100 calculates X coordinates away from an X coordinate of the center coordinates by 105 mm and −105 mm, respectively and Y coordinates away from a Y coordinate of the center coordinates by 148.5 mm and −148.5 mm, respectively (step S308).

CPU 100 generates a request message for requesting map data (second image data) and transmits the request message to server SRV via network I/F unit 122 (step S310). Network I/F unit 122 receives the map data (second image data) (step S312). When a print start command is input to touch panel 136 (step S314), CPU 100 determines whether or not printer 116 is in a printable state (step S316). If printer 116 is in the printable state (YES in step S316), printer 116 prints an image on the designated sheet (step S318).

(Region-Preferred Print Processing Performed by Image Formation Apparatus MFP)

Figure 14:
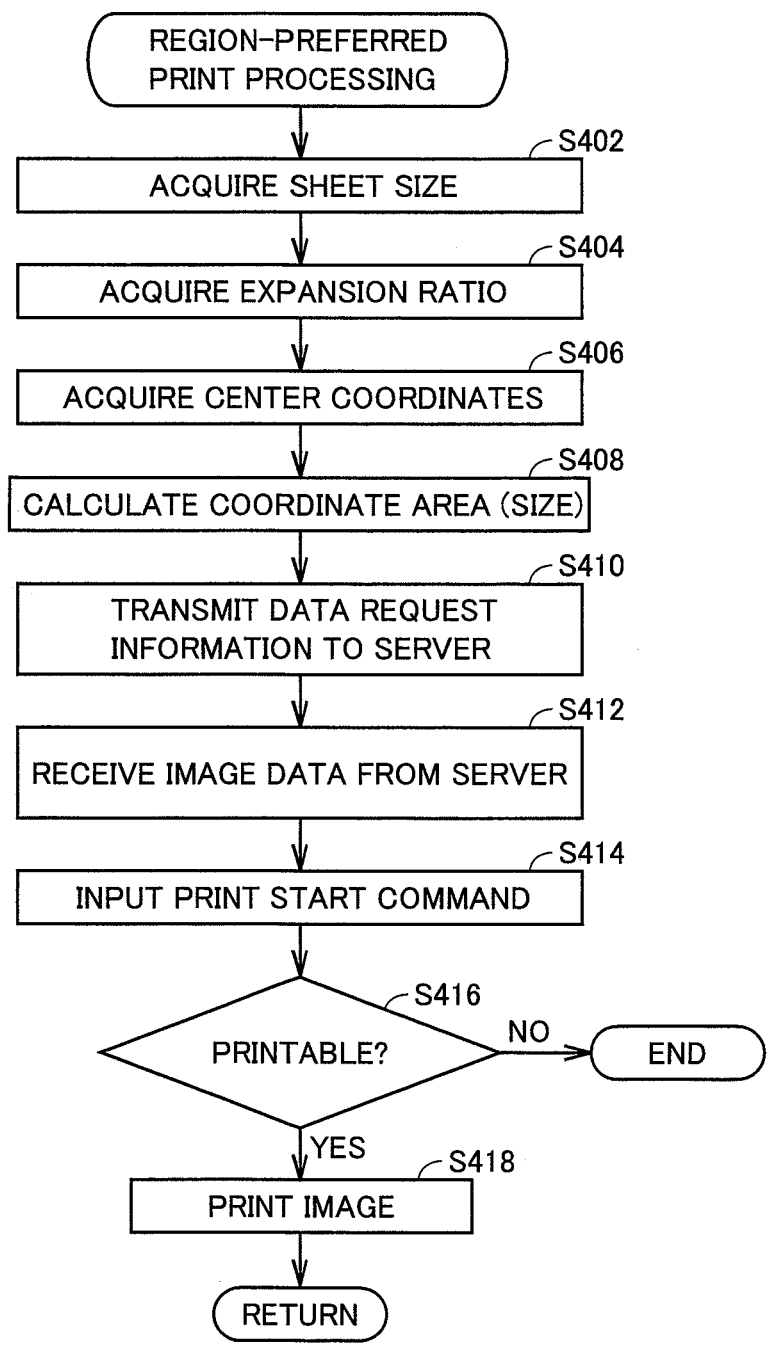
FIG. 14 is a flowchart showing processing procedures of a region-preferred print processing performed by the image formation apparatus.

FIG. 14 is a flowchart showing processing procedures of the region-preferred print processing performed by image formation apparatus MFP. As shown in FIG. 14, in the region-preferred print processing (step S400), CPU 100 read a sheet size stored in S-RAM 104 (step S402) and acquires a size change ratio corresponding to the sheet size from MFP storage unit 110-2 (step S404). In the region-preferred print processing, CPU 100 acquires an image area magnification ratio of the size of the display region (first image size) to the sheet size (print image size) (step S404). CPU 100 reads the position coordinates stored in S-RAM 104 (step S406), calculates the X-direction (lateral) length (width) and the Y-direction (longitudinal) length (height) of the image area (second image size) and acquires the image area (second image size) (step S408). Namely, CPU 100 calculates the X-direction length and the Y-direction length of the image area as the second image size.

Alternatively, CPU 100 may read the position coordinates stored in S-RAM 104 (step S406) and calculate coordinates of X-direction (lateral) ends and those of Y-direction (longitudinal) ends of the image area centering around the position coordinates (step S408). Coordinates of four corners of the image area as the second image size are decided by the coordinates of the X-direction (lateral) ends and those of the Y-direction (longitudinal) ends of the image area centering around the position coordinates.

For example, if the size of the display region of display unit 138 is 148.4 mm×105 mm and a B4 size (257 mm×365 mm) is selected as the print sheet size, CPU 100 acquires 2.4 as the scale (degree-of-detail) change ratio from MFP storage unit 110-3 stored in MFP storage unit 110-1 (step S404). CPU 100 reads the center coordinates of the image displayed on display unit 138 from S-RAM 104 (step S406) and calculates an X-direction length of 256 mm and a Y-direction length of 356.4 mm of the image area (step S408). Alternatively, CPU 100 calculates X coordinates away from an X coordinate of the center coordinates by 126 mm and −126 mm, respectively and Y coordinates away from a Y coordinate of the center coordinates by 178.2 mm and −178.2 mm, respectively (step S408).

CPU 100 generates a request message for requesting map data (second image data) and transmits the request message to server SRV via network I/F unit 122 (step S410). Network I/F unit 122 receives the map data (second image data) (step S412). When a print start command is input to touch panel 136 (step S414), CPU 100 determines whether or not printer 116 is in a printable state (step S416). If printer 116 is in the printable state (YES in step S416), printer 116 prints an image on the designated sheet (step S418).

In the above-stated embodiment, the instance in which CPU 100 designates the size of the first image data as well as the size of the second image data in advance and acquires the sizes thereof has been described. However, the present invention is not limited to the instance. CPU 100 may display the image data included in the website received from server SRV on display unit 138 as it is and may deal with image data of the displayed area as the first image data. Namely, CPU 100 does not always designate the size of the first image data.

Furthermore, in the above-stated embodiment, the map data has been described as an example of the image data. If the image data is photograph data and the magnification-preferred mode is selected, CPU 100 increases a resolution in place of the scale according to enlargement of the image data. If the region-preferred mode is selected, CPU 100 enlarges image data similarly to the map data.

Other Embodiments

A program according to the present invention may be configured to invoke necessary program modules among program modules provided as a part of an operating system (OS) of a computer in a predetermined arrangement at a predetermined timing and to execute a processing. In that case, the program does not include the modules per se but the processing is executed in cooperation with OS. Such a program that does not include modules could be contained in the program according to the present invention.

Moreover, the program according to the present invention may be provided by being incorporated into a part of another program. In that case, similarly to the above case, the program does not include the modules per se but the processing is executed in cooperation with another program. Such a program that is incorporated into the part of another program could be contained in the program according to the present invention.

A program product to be provided is installed into a program storage unit of a hard disk or the like and executed. It is to be noted that the program product includes the program itself and a storage medium storing therein the program.

Furthermore, a part of or all of functions realized by the program according to the present invention may be constituted by dedicated hardware.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image formation apparatus connected via a network to a server storing therein image data, comprising:
    an acquisition unit for acquiring the image data from said server;
    a display unit for displaying first image data of a first image size area based on the image data acquired by said acquisition unit;
    a printer for printing the image data on a recording medium;
    a setter for setting a size of the image data printed on said recording medium by said printer;
    a specification unit for specifying second image data of a second image size such that the second image data corresponding to the first image data is printed on said recording medium at the size of the image data set by said setter; and
    an acquisition mode setter accepting from a user a setting of a first acquisition mode or a second acquisition mode designating a standard of acquiring said second image data; wherein
    said specification unit specifies,
    if the first acquisition mode is set at said acquisition mode setter, image data of the second image size obtained by enlarging said first image data and increasing a scale, as the second image data to be acquired; and
    if said second acquisition mode is set at said acquisition mode setter, image data of the second image size obtained by expanding a region from the image indicated by said first image data to include a wider area than an area represented by said first image data, as the second image data to be acquired,
    said acquisition unit acquires the second image data of said second image size specified by said specification unit, and
    said printer prints said second image data at the size set by said setter.

2. The image formation apparatus according to claim 1, wherein said image data is map data.

3. The image formation apparatus according to claim 1, wherein said acquisition unit acquires the image data by using a web browser.

4. The image formation apparatus according to claim 1, further comprising an operation unit for accepting an operation from a user such that a user's desired region of image data acquired by said acquisition unit is displayed on said display unit, and
    wherein the image data operated by said operation unit and displayed on said display unit is the first image data of said first image size.

5. An image formation apparatus connected via a network to a server storing therein image data, comprising:
    an acquisition unit for acquiring the image data from said server;
    a display unit for displaying first image data of a first image size based on the image data acquired by said acquisition unit;
    a printer for printing the image data on a recording medium;
    a setter for setting a size of the image data printed on said recording medium by said printer;
    a specification unit for specifying second image data of a second image size such that the second image data corresponding to the first image data is printed on said recording medium at the size of the image data set by said setter; and
    an acquisition mode setter accepting from a user a setting of a first acquisition mode or a second acquisition mode designating a standard of acquiring said second image data; wherein
    said specification unit specifies,
    if the first acquisition mode is set at said acquisition mode setter, image data of the second image size obtained by enlarging said first image data and increasing a resolution, as the second image data to be acquired, and
    if said second acquisition mode is set at said acquisition mode setter, image data of the second image size obtained by expanding a region from the image indicated by said first image data to include a wider area than an area represented by said first image data, as the second image data to be acquired, said acquisition unit acquires the second image data of said second image size specified by said specification unit, and said printer prints said second image data at the size set by said setter.

6. The image formation apparatus according to claim 5, wherein said image data is photograph data.

7. The image formation apparatus according to claim 5, wherein said acquisition unit acquires the image data by using a web browser.

8. A print method for an image formation apparatus connected via a network to a server storing therein image data, and including a display unit for displaying the image data and a printer for printing the image data on a recording medium, the print method comprising:

a first acquisition step of acquiring the image data from said server, a display step of displaying on said display unit first image data of a first image size based on the image data acquired by said first acquisition step, a setting step of setting a size of the image data printed on said recording medium by said printer, a specification step of specifying second image data of a second image size such that the second image corresponding to the first image data is printed on said recording medium at the size of image data set by said setting step, an acquisition mode setting step of accepting from a user a setting of a first acquisition mode or a second acquisition mode designating a standard of acquiring said second image data, a second acquisition step of acquiring second image data of said second image size specified by said specification step, and a printing step of causing said printer to print said second image data at the size set by said setting step, wherein in said specification step, if the first acquisition mode is set by said acquisition mode setting step, image data of the second image size obtained by enlarging said first image data and increasing a resolution is specified as the second image data to be acquired, if the second acquisition mode is set by said acquisition mode setting step, image data of the second image size obtained by expanding a region from the image indicated by said first image data to include a wider area than an area represented by said first image data, as the second image data to be acquired.

9. The print method according to claim 8 wherein said image data is map data.

10. The print method according to claim 8, wherein said first acquisition step and said second acquisition step acquire image data by using a web browser.

11. The print method according to claim 8, said image formation apparatus further including an operation unit for accepting an operation from a user such that a user's desired region of said acquired image data is displayed on said display unit, and said print method for the image formation apparatus further comprising an operation step of accepting an operation from a user at said operation unit such that a user's desired region of image data acquired by said first acquisition step is displayed on said display unit, wherein the image data displayed on said display unit by said operation is the first image data of said first image size.

12. A print method for an image formation apparatus connected via a network to a server storing therein image data, and including a display unit for displaying the image data and a printer for printing the image data on a recording medium, the print method comprising:

a first acquisition step of acquiring the image data from said server, a display step of displaying on said display unit first image data of a first image size based on the image data acquired by said first acquisition step, a setting step of setting a size of the image data printed on said recording medium by said printer, a specification step of specifying second image data of a second image size such that the second image corresponding to the first image data is printed on said recording medium at the size of image data set by said setting step, an acquisition mode setting step of accepting from a user a setting of a first acquisition mode or a second acquisition mode designating a standard of acquiring said second image data, a second acquisition step of acquiring second image data of said second image size specified by said specification step, and a printing step of causing said printer to print said second image data at the size set by said setting step, wherein in said specification step, if the first acquisition mode is set by said acquisition mode setting step, image data of the second image size obtained by enlarging said first image data and increasing a resolution is specified as the second image data to be acquired, and if the second acquisition mode is set by said acquisition mode setting step, image data of the second image size obtained by expanding a region from the image indicated by said first image data to include a wider area than an area represented by said first image data, as the second image data to be acquired.

13. The print method according to claim 12 wherein said image data is photograph data.

14. The print method according to claim 12, wherein said first acquisition step and said second acquisition step acquire image data by using a web browser.

15. A non-transitory computer readable storage medium comprising a print program to be executed by a computer of an image formation apparatus connected via a network to a server storing therein image data, and including a display unit for displaying the image data and a printer for printing the image data on a recording medium, said print program, when executed by the computer, causing said computer to execute:

a first acquisition step of acquiring the image data from said server, a display step of displaying on said display unit first image data of a first image size based on the image data acquired by said first acquisition step, a setting step of setting a size of the image data printed on said recording medium by said printer, a specification step of specifying second image data of a second image size such that the second image corresponding to the first image data is printed on said recording medium at the size of image data set by said setting step, an acquisition mode setting step of accepting from a user a setting of a first acquisition mode or a second acquisition mode designating a standard of acquiring said second image data, a second acquisition step of acquiring second image data of said second image size specified by said specification step, and a printing step of causing said printer to print said second image data at the size set by said setting step, wherein, in said specification step, if the first acquisition mode is set by said acquisition mode setting step, image data of the second image size obtained by enlarging said first image data and increasing a resolution is specified as the second image data to be acquired, and if the second acquisition mode is set by said acquisition mode setting step, image data of the second image size obtained by expanding a region from the image indicated by said first image data to include a wider area than an area represented by said first image data is specified as the second image data to be acquired.

16. The non-transitory computer readable storage medium according to claim 15, wherein said image data is map data.

17. The non-transitory computer readable storage medium according to claim 15, wherein said first acquisition step and said second acquisition step acquire image data by using a web browser.

18. The non-transitory computer readable storage medium according claim 15, said image formation apparatus further including an operation unit for accepting an operation from a user such that a user's desired region of said acquired image data is displayed on said display unit, said print program causing said computer of said image formation apparatus to further execute:

an operation step of accepting an operation from a user at said operation unit such that a user's desired region of image data acquired by said first acquisition step is displayed on said display unit, wherein the image data displayed on said display unit by said operation is the first image data of said first image size.

19. A non-transitory computer readable storage medium comprising a print program to be executed by a computer of an image formation apparatus connected via a network to a server storing therein image data, and including a display unit for displaying the image data and a printer for printing the image data on a recording medium, said print program, when executed by the computer, causing said computer to execute:

a first acquisition step of acquiring the image data from said server, a display step of displaying on said display unit first image data of a first image size based on the image data acquired by said first acquisition step, a setting step of setting a size of the image data printed on said recording medium by said printer, a specification step of specifying second image data of a second image size such that the second image corresponding to the first image data is printed on said recording medium at the size of image data set by said setting step, an acquisition mode setting step of accepting from a user a setting of a first acquisition mode or a second acquisition mode designating a standard of acquiring said second image data, a second acquisition step of acquiring second image data of said second image size specified by said specification step, and a printing step of causing said printer to print said second image data at the size set by said setting step, wherein, in said specification step, if the first acquisition mode is set by said acquisition mode setting step, image data of the second image size obtained by enlarging said first image data and increasing a resolution is specified as the second image data to be acquired, and if the second acquisition mode is set by said acquisition mode setting step, image data of the second image size obtained by expanding a region from the image indicated by said first image data to include a wider area than an area represented by said first image data is specified as the second image data to be acquired.

20. The non-transitory computer readable storage medium according to claim 19, wherein said image data is photograph data.

21. The non-transitory computer readable storage medium according to claim 19, wherein said first acquisition step and said second acquisition step acquire image data by using a web browser.

* * * * *

UNITED STATES PATENT AND TRADEMARK OFFICE
CERTIFICATE OF CORRECTION

PATENT NO. : 8,599,406 B2  
APPLICATION NO. : 12/401874  
DATED : December 3, 2013  
INVENTOR(S) : Hiroaki Sugimoto Page 1 of 1

It is certified that error appears in the above-identified patent and that said Letters Patent is hereby corrected as shown below:

In the Claims:

At column 17, line numbers 63-64, please replace "a first image size area" with --a first image area--

Signed and Sealed this
Fifteenth Day of April, 2014

Michelle K. Lee
*Deputy Director of the United States Patent and Trademark Office*